United States Patent [19]

Lindauer et al.

[11] Patent Number: 5,714,847
[45] Date of Patent: Feb. 3, 1998

[54] POWER REGULATOR

[75] Inventors: Louis F. Lindauer, Wilmington, Del.; Adrian F. Ionescu, Patchogue, N.Y.

[73] Assignee: Lighting Control, Inc., Aston, Pa.

[21] Appl. No.: 617,028

[22] Filed: Mar. 18, 1996

Related U.S. Application Data

[63] Continuation-in-part of Ser. No. 143,338, Oct. 27, 1993, Pat. No. 5,500,575.
[51] Int. Cl.$^6$ .................................................. G05F 1/00
[52] U.S. Cl. ...................... 315/307; 315/308; 315/311; 315/291; 315/DIG. 4; 315/DIG. 7
[58] Field of Search ...................... 315/307, 308, 315/311, 224, 225, 226, 241 R, 246, 283, 291, 356, 289, 194, DIG. 4, DIG. 7; 323/244, 265, 282, 283

[56] References Cited

U.S. PATENT DOCUMENTS

| | | | |
|---|---|---|---|
| 4,663,569 | 5/1987 | Alley et al. | 315/175 |
| 4,797,599 | 1/1989 | Ference et al. | 315/194 |
| 4,998,046 | 3/1991 | Lester | 315/209 R |
| 5,004,972 | 4/1991 | Roth | 315/194 X |
| 5,018,058 | 5/1991 | Ionescu et al. | 363/34 |
| 5,045,774 | 9/1991 | Bromberg | 323/322 |
| 5,107,184 | 4/1992 | Hu et al. | 315/291 |
| 5,455,490 | 10/1995 | Callahan et al. | 315/194 |

FOREIGN PATENT DOCUMENTS

| | | |
|---|---|---|
| 390532 | 7/1987 | Germany. |
| 2045549 | 10/1980 | United Kingdom. |

Primary Examiner—Robert Pascal
Assistant Examiner—Haissa Philogene
Attorney, Agent, or Firm—Panitch Schwarze Jacobs & Nadel, P.C.

[57] ABSTRACT

A power regulator system provides power to an electrical load. A power level selector generates a reference signal which indicates a desired power level for the electrical load, and a control circuit connected with a AC power source interrupts flow of the AC current for periods of time responsive to a reference system from the power selector. A filtering circuit filters the output of the control circuit and generates therefrom a second output AC circuit which is smooth relative to this interrupted AC circuit. This smooth AC output is applied to the load. A relay is provided to prevent overload conditions from forming adjacent the load in the circuit. Various types of sensors may be used as the power level indicator, such sensors including the light detector as movement detectors, and other electrical sensors.

21 Claims, 8 Drawing Sheets

POWER REGULATOR

RELATED APPLICATIONS

This application is a continuation-in-part of the application of Adrian Ionescu entitled "Switchmode AC Power Controller", filed on Oct. 27, 1993, and having the Ser. No. 08/143,338, now U.S. Pat. No. 5,500,575.

FIELD OF THE INVENTION

This invention relates to alternating current power regulators, and more particularly to regulators used for varying and terminating the alternating electromotive force ("voltage") output applied to a variety of loads, including but not limited to lighting systems, power supplies, circuit breakers, appliances, and power distribution networks.

BACKGROUND OF THE INVENTION

Alternating Current ("AC") power regulation has been implemented in a variety of ways. Several of these implementations provide a variable sinusoidal output voltage to an intended load. Where the intended load is a light source, like incandescent, fluorescent, metal halide, or high pressure sodium lamps, the power regulator is also known as a "dimmer."

The advantage of providing a variable sinusoidal output voltage resides in the fact that a sinusoidal voltage produces a relatively low electrical and mechanical noise level during operation. The electrical noise in this sense refers mainly to signals back-propagated into the AC power supply, e.g., third, fifth, seventh, ninth, or other odd harmonics, which distort its almost pure sinusoidal wave-form.

One power control method that preserves the sinusoidal wave-form utilizes a high power variable resistor in series with an intended load. Since the resistor increases the overall load resistance seen by a voltage source ($R_{seen}=R_{load}+R_{resistor}$), and according to Ohm's law current is inversely proportional to resistance ($I=V/R$), the amount of current flowing through the intended load is reduced. Hence the voltage across the load is also reduced ($V_{load}=I_{load}R_{load}$) in the same proportion as the current. This method is also know as a voltage divider, and can be used in both direct current and alternating current electric networks. The series resistor, however, dissipates large amounts of power as heat ($P=I^2R_{resistor}$), resulting in a low overall efficiency.

Another method of regulating the output voltage employs a manual or motor driven variable voltage transformer to deliver a controllable voltage to the load. Although the efficiency of this method is relatively high, the size, weight and cost of the equipment renders this method unsuitable for many applications that require compact design and quick response time. Additionally, the variable voltage transformer, like any other mechanical device, is subject to mechanical wear. Lastly, an additional cost is incurred for an external fuse or circuit breaker to protect the internal winding from self-destruction during an output overload or short-circuit.

In yet another method, a variation of the generic D class amplifier electronic power circuit has been used to synthesize a variable output sinusoidal voltage. U.S. Pat. No. 5,018,058 to Ionescu et al, describes a dual conversion high frequency switching AC controller. After the first conversion, two 60 Hz modulated unipolar variable voltage sources provide the voltages required by the output stage, designed along the class D amplifier guidelines. Pursuant to this patent, however, both unipolar voltage sources used by the output stage are not DC, but rather are two half cycle waveforms, of a higher magnitude than the input voltage. Although this method could in principle be used for providing power to numerous applications, it represents expensive overkill for those not requiring very precise waveform modulation. The accurate reconstruction of an ideal sinusoidal output waveform achieved by the amplifier, virtually independent of the input voltage waveform, will impose a relatively high manufacturing cost for most applications, especially for those not requiring perfect sinusoidal output. For the purposes of regulating power to a lighting system, power supply, and to most appliances, this particular method represents a cost which may not be justifiable to the consumer.

Aside from these sine wave maintaining systems, a relatively newer class of power regulators use triacs or silicon controlled rectifiers (SCR's) operating under what is generically called "variable phase angle modulation." In these methods, the triac is turned on at different phases of each half cycle of the sinusoidal waveform. The abrupt on/off switching action of the SCR creates discontinuity in the sinusoidal waveform, thereby introducing noise to the line. The sharp and prolonged discontinuity also results in a large current surge through the load each time the turn-on event occurs. This high turn-on surge current injects major mechanical and electric noise (odd harmonics) back into the electric network. Such noise is a serious problem at the high current levels that would be present in many applications, such as a lighting system for a theater or an outdoor lighting situation such as at a ball park.

To solve this problem, many systems have employed expensive equipment seeking to reduce or eliminate both mechanical and electrical noise. For example, in some cases a large output inductor has been connected in series with the load to limit the di/dt factor by distributing the surge current at the turn-on point over several hundred microseconds. There is a limit, however, to the period of time over which the surge may be smoothed without sacrificing the regulator's overall efficiency. A typical rule of thumb is that the time period cannot exceed one millisecond. A load requiring higher power levels will need a longer period of time for distributing the turn-on surge current than a load requiring lower power. The long time period associated with a system tuned for high power loads will still cause significant amounts of mechanical and electrical noise, especially when a mismatched lower power load is used.

U.S. Pat. No. 4,633,161 to Callahan et al., describes an inductorless phase control dimmer. This patent is directed to the elimination of the filter inductor from the output stage of a dimmer. A pair of MOSFETs are slowly turned on resulting in a low di/dt factor and practically very little mechanical and electric noise. The major disadvantage of this invention is the large amount of power dissipation which occurs while both MOSFET's are operating in linear mode, during their turn on process. Additionally, the $R_d$'s of the MOSFET's increase with the temperature, thereby further increasing the amount of power dissipated. Often, a large heat sink is needed to properly dissipate the resulting heat. In the case of an output overload or short circuit, the absence of an inductor will cause a sharp output current increase, which may reach fatal levels before the internal current limiting system can react and turn off the MOSFET's.

Depending upon the particular application of the power regulator, various means are used to set the desired output power level. Many systems still employ a manual open loop means such as a dial or knob in conjunction with an output level meter, thus allowing an operator to set the desired output power level. Newer systems, however, use automated, closed loop means. For example, infrared and sonic motion detectors are sometimes used to trigger the turning on or off of a lighting system. Light meters are also used in order to turn on lighting in an area after the natural light level in the area falls below a certain minimum value. The disadvantage of many of the currently available automated control lighting systems, however, is that they are usually not integrated into a power regulator, and thus have to be interfaced with an existing power distribution system using expensive interface equipment.

Due to the potential for overloads and short-circuit conditions in lighting and power distribution networks, circuit breakers are often employed to safeguard against the consequences of such occurrences. A circuit breaker is placed in series with a load and when the current flowing through the circuit breaker exceeds some predefined level, the circuit breaker opens, or "trips", terminating all current flow to the load. There are two primary drawbacks to the standard circuit breaker, the first is a slow response time. The typical circuit breaker works on the principle of thermal expansion of a conducting element. When the current running through a circuit breaker exceeds a predefined limit, ohmic heating of a conducting element within the circuit breaker causes the element to expand to a point where the expansion triggers the release of a spring which in turn moves the conducting elements out of the conducting path and breaks the circuit. Since the circuit breaker is mechanical in nature, it is subject to the inherent limitations of all mechanical devices, one of which being a slow response time relative to that of an electrical system. It may take anywhere from several milliseconds to several seconds before a circuit breaker trips in response to a short circuit or overload condition. This period is much longer than it would take for serious damage to occur to sensitive electronic components.

A second drawback to the standard circuit breaker is that it must be physically reset each time it has been tripped. Even if the condition which originally caused the circuit breaker to trip no longer exists, the circuit breaker will not reset and close the power supply circuit. An individual will have to manually reset the circuit breaker.

SUMMARY OF THE INVENTION

The present invention provides a solid state, high frequency AC power regulator which avoids the difficulties and disadvantages of prior AC power regulators. The invention provides for an amplitude controlled output waveform almost identical with the waveform of the applied input AC line voltage. When used to control power delivery to a lighting system, the present invention is also known as a "dimmer." Additionally, the present invention may be used as a high speed circuit breaking system which avoids the difficulties and disadvantages of currently used circuit breakers.

The invention contains an RFI filter interface to the input AC line, which limits the magnitude of switching transients injected back into the AC line. As a solid state relay it acts as a high speed circuit breaker which automatically resets upon the termination of the condition which had caused the excessive current flow and had triggered the relay to open. Additionally, the output power level is capable of being set through a variety of input devices including but not limited to a timer, a light detector, a motion sensor, or the like. The regulator can be set to either increase, decrease or terminate power to the load in response to a signal from any of the aforementioned input devices.

The invention is suited to control power output to various lighting devices including but not limited to incandescent, fluorescent, metal halide, and high pressure sodium lamps. The present invention can also be used to regulate power to a variety of other loads such as appliances and entire power distribution networks.

Other objects and advantages of the invention will become apparent herein, and the scope of the invention will be articulated in the claims.

BRIEF DESCRIPTION OF THE DRAWINGS

The present invention is further described below with reference to the accompanying drawings, in which.

5 shows another circuit configuration of the AC solid state switch 20 and synchro-flywheel 30 used in the embodiment shown in FIGS. 1 and 2.

DETAILED DESCRIPTION

A preferred embodiment of the present invention will now be described with reference to the attached FIGS. 1 through 10.

Figure 1:
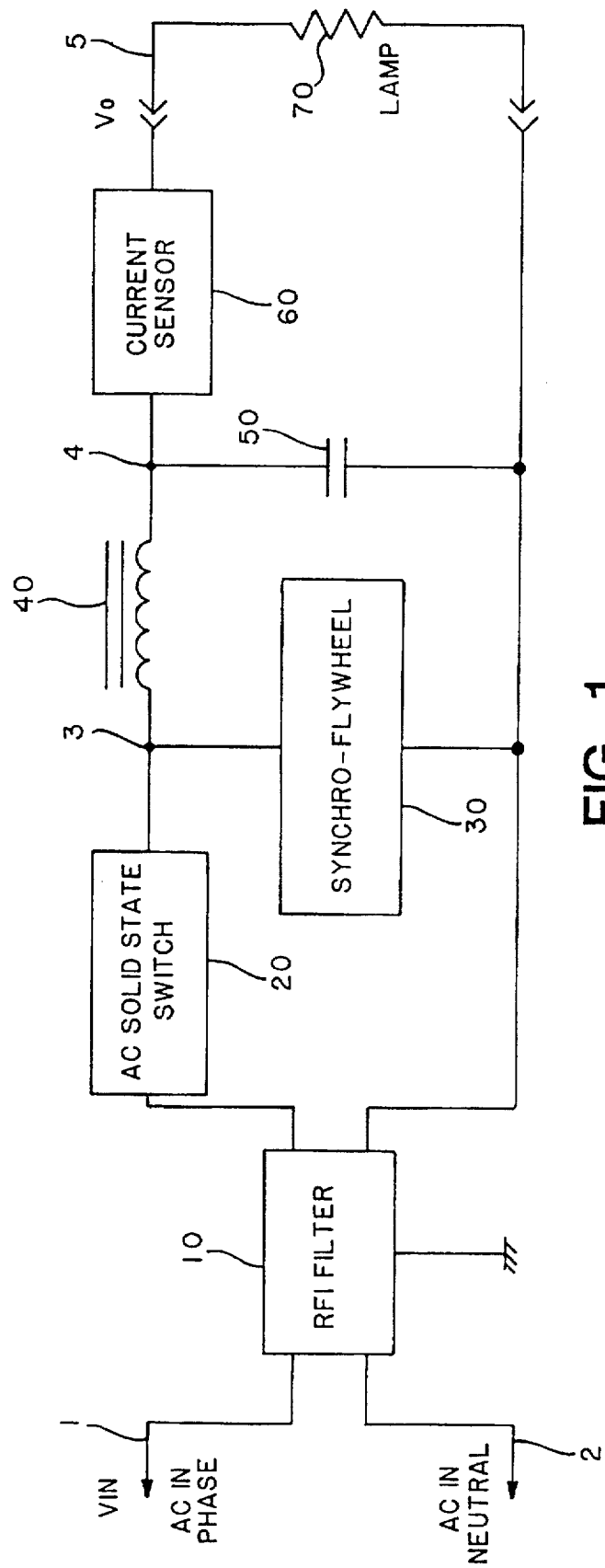
FIG. 1 is a block diagram of a preferred embodiment of the invention.

FIG. 1 depicts a basic simplified block diagram of the invention showing its principal elements. An AC solid state switch 20 supplies the load current, with its on/off ratio (duty cycle) set according to the desired output voltage on line 5 and load current requirements. An output filtering and waveform re-shaping stage is provided having an inductor 40 and a filter capacitor 50. A synchro-flywheel 30 allows the discharge of the excessive energy stored in the output inductor 40. The synchro-flywheel 30 is reverse biased during the time the AC solid state switch is on and direct biased when the AC solid state switch 20 is off. The inductor 40 discharge current travels through a load 70, the synchro-flywheel 30 and the inductor 40. During the inductor 40 discharge portion of the cycle, current continues to flow in the same direction and the output voltage maintains the same polarity as the input voltage encountered during the time the AC solid state switch 20 was on, increasing the overall system efficiency and reducing the output voltage ripple. Thus it may be observed that the synchro-flywheel 30 discharges the inductor 40 during the time off cycle of the switch 20 to maintain the sine-wave form of the output voltage.

Figure 5:
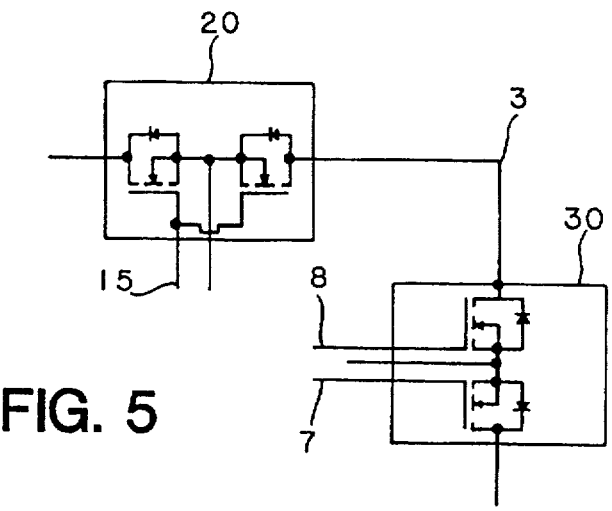

As best shown in FIG. 5, the synchro-flywheel 30 has two common source MOSFET switches. Depending upon the polarity of the AC signal, a conductive path is established either through the upper diode and lower MOSFET, or vice versa.

Figure 10:
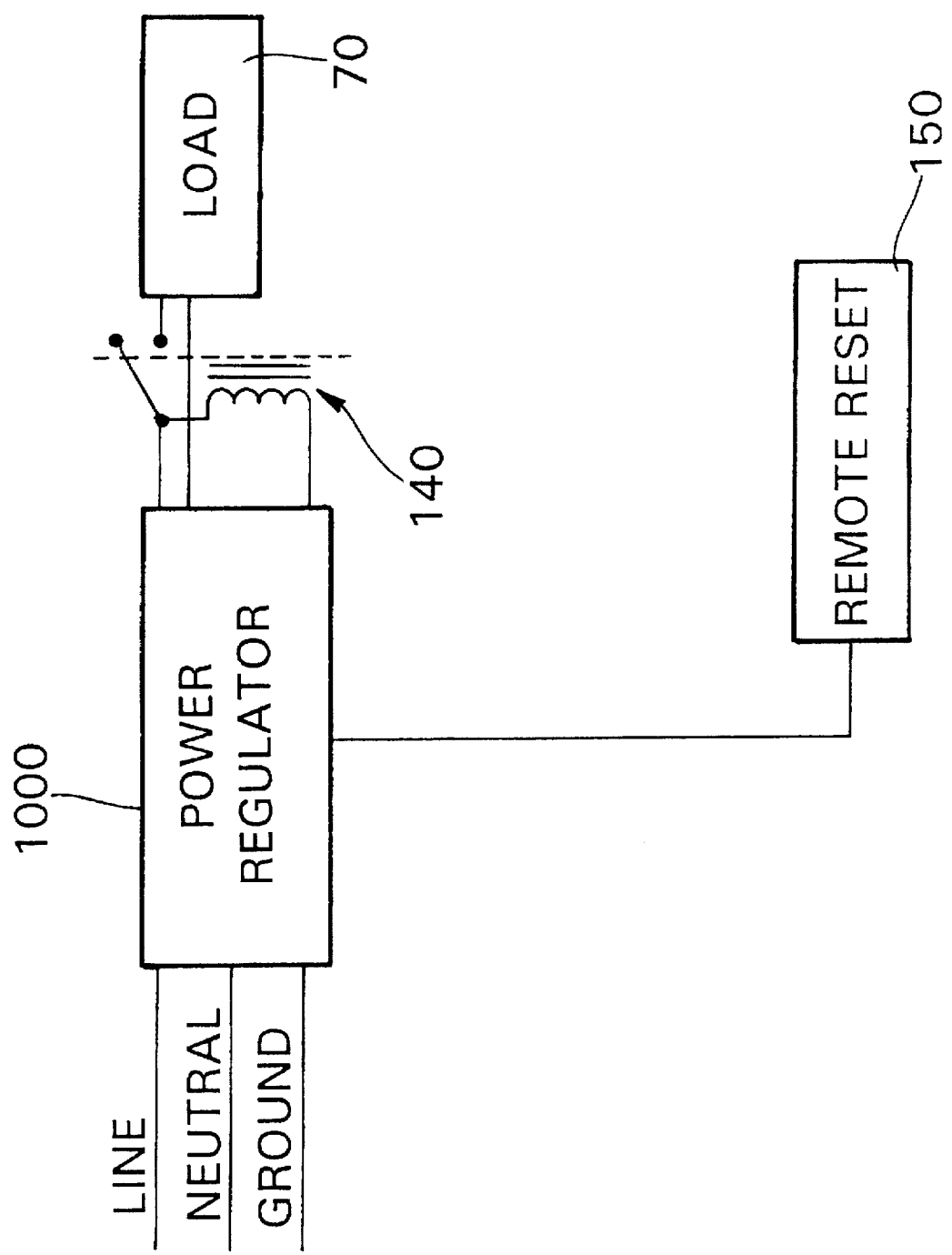
FIG. 10 shows the power regulation block 1000 regulating power to a load 70 and receiving input from input device 130, where a relay 140 is in series with the load 70, and the input device 130 is a remote reset.

If an output current sensing device 60, perceives a current above some preset maximum, it controls the pulse width modulation pulses to reduce the output voltage such that the unit behaves as a constant current source at the preset maximum current level, providing a constant output current on line 5 capable of accommodating loads with large thermal lags. If overloading persists, then the current is shut off completely after a preset period of time has expired. If the output current sensing device 60 encounters a current sufficiently high to clearly indicate either a short circuit or overload condition, it shuts down the regulator immediately without the limited period intended to accommodate for thermal lag. In this case, the current sensor 60 not only turns off the AC solid state switch 20, but also sends a signal to relay 140 to open, thereby terminating all current flow to the load 70. The system intermittently resets by closing the relay 140 and turning on the AC solid state switch 20. If the short-circuit or overload condition persists, the current sensor 60 will cause the regulator to shutdown once again. The regulator will attempt to reset a predetermined number of times before shutdown is final. Once shutdown is final, the operator must manually reset the regulator before the regulator will operate. FIG. 10 shows the power regulator block 1000 connected to a load 70, with a relay 140 in series, and a remote reset 150 used to reset the regulator after the regulator has had a final shutdown. The series relay 140 is such as to open or close a contact responsive to a overload condition in conductor 5.

Figure 2:
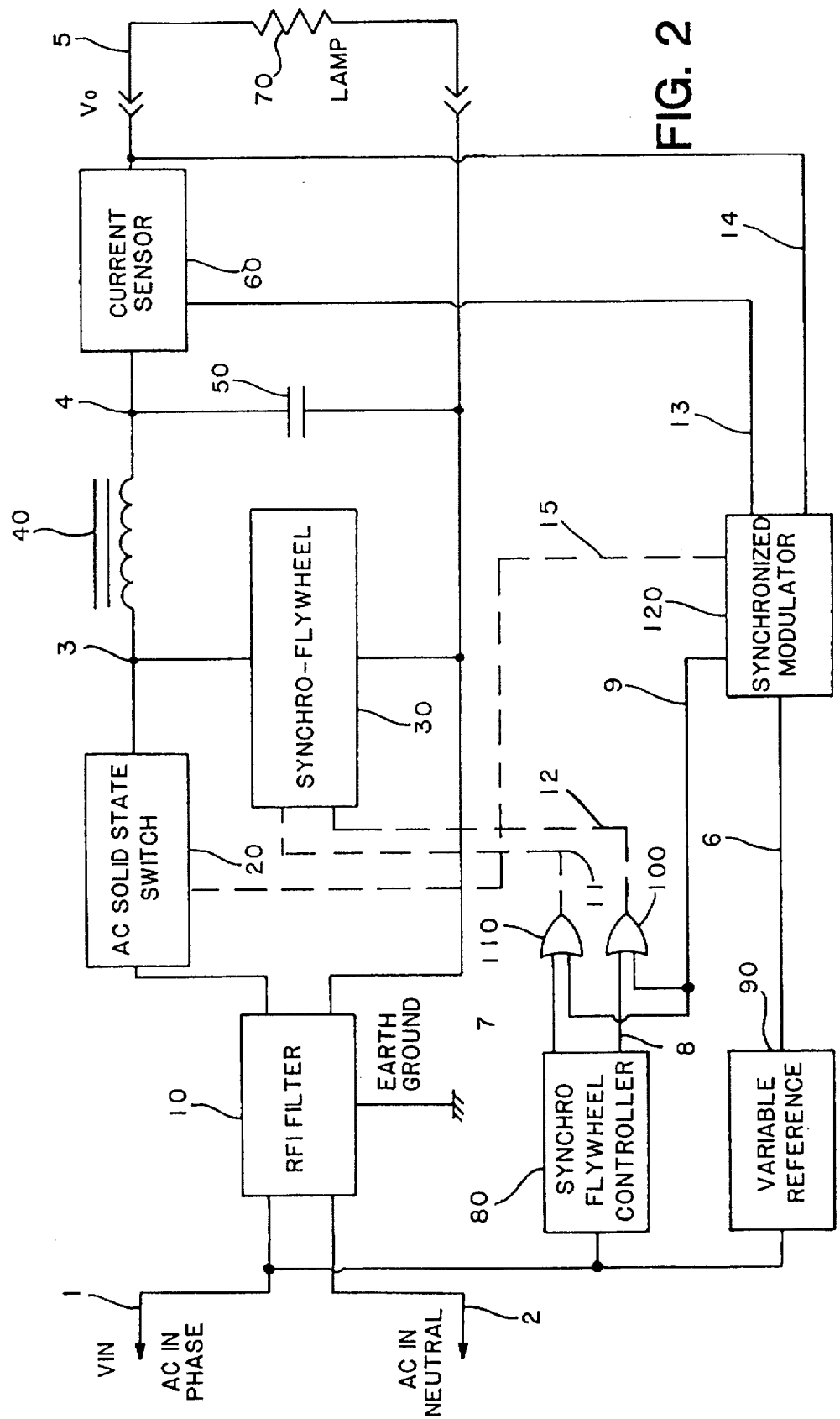
FIG. 2 is a block diagram of an alternate embodiment of the invention.

A more detailed depiction of a preferred embodiment is shown in FIG. 2, which has corresponding elements similarly numbered to those in FIG. 1.

FIG. 2 shows an AC power controller having an RFI filter 10 that reduces the magnitude of high frequency switching electric noise and transients injected by the system back into the AC line 1. A variable reference 90 receives the AC voltage from the AC line 1, and generates therefrom a low voltage reference signal on line 6. The reference signal on line 6 controls an output voltage amplitude anywhere from zero to a maximum value equaling that of the input line 1 amplitude less any voltage losses in the circuit. The variable reference 90 can be a simple potentiometer, a DC gain controlled operational amplifier, or an "n" bit digitally gain-controlled operational amplifier, where "n" is the number of bits which can be selected to provide for the desired number of power level increments.

It is desirable, to allow for various means by which to adjust the setting of the variable reference. Input device 130 represents any one of a number of possible devices which may be connected to the variable reference 90 and used to continually adjust the variable reference 90, effectively adjusting the regulator's voltage and power output, either manually or automatically in response to a stimulus.

Figure 8:
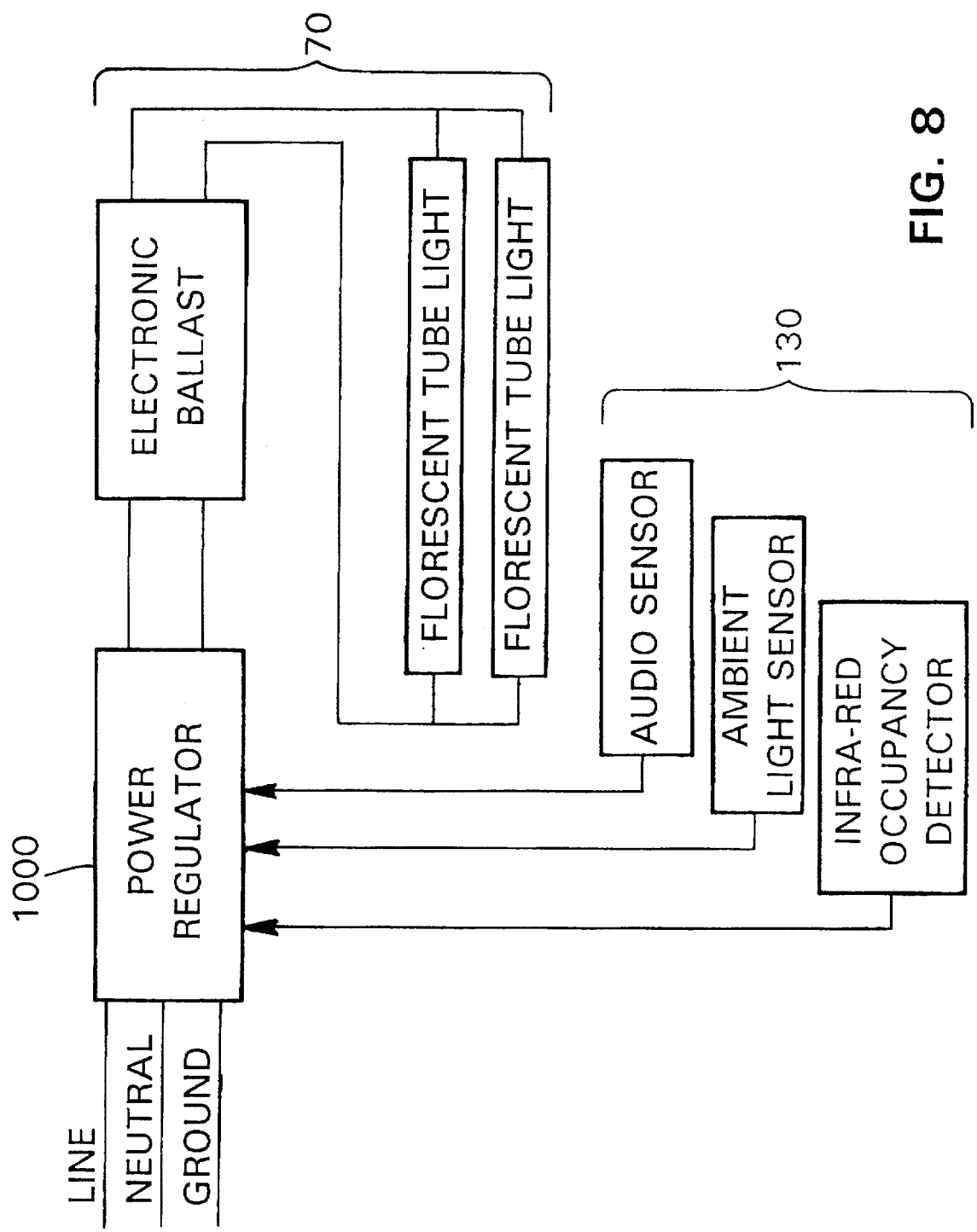
FIG. 8 shows the power regulation block 1000 regulating power to a load 70 and receiving input from input device 130, where the load 70 is an electronic ballast and a fluorescent tube, and the input device 130 maybe one or more of the following: an audio sensor, an ambient light meter, an infra-red occupancy detector.
Figure 9:
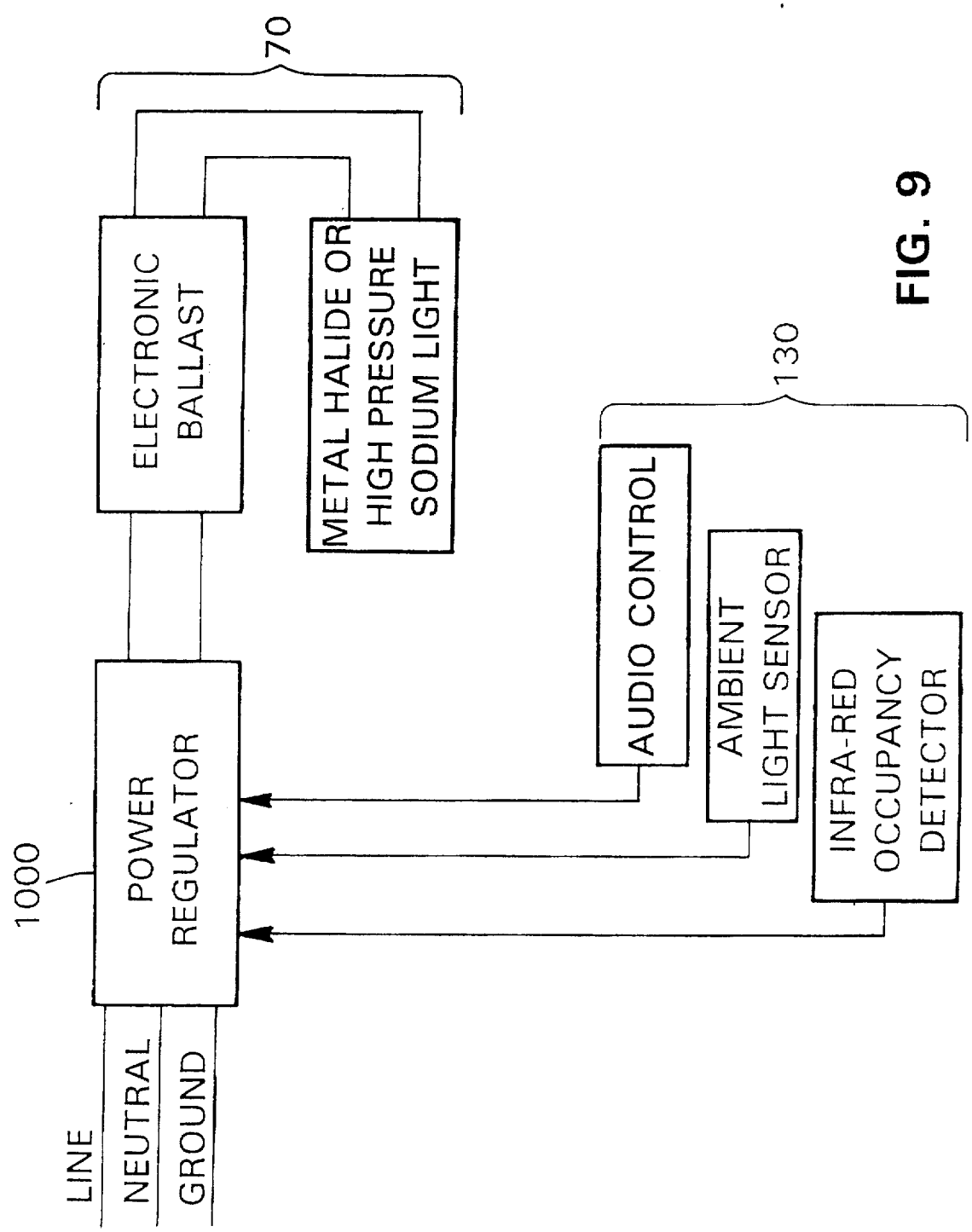
FIG. 9 shows the power regulation block 1000 regulating power to a load 70 and receiving input from input device 130, where the load 70 is an electronic ballast and a metal halide or high pressure sodium light, and the input device 130 is one or more of the following: an audio sensor, an ambient light meter, an infra-red occupancy detector.

Additionally, a combination of input devices may be used in conjunction, in order to provide multiple input paths and allow the regulator to respond to a variety of stimuli such as light, sound, motion or elapsed time, as indicated by a timer. FIG. 8 and FIG. 9 show three possible input devices 130 which may be connected to the variable reference 90, allowing the power regulator 100 to respond to a real world stimulus. A number of applications exist for the use of input devices in conjunction with the regulator 1000, including but not limited to the turning on/off or adjustment of lighting luminosity in response to any real world event, such as the passing of time, the dimming of natural light, or any action of a person, where such action is detectable by said input devices (e.g. motion, sound, light intensity or manipulation of a manually operated control knob).

Figure 3:
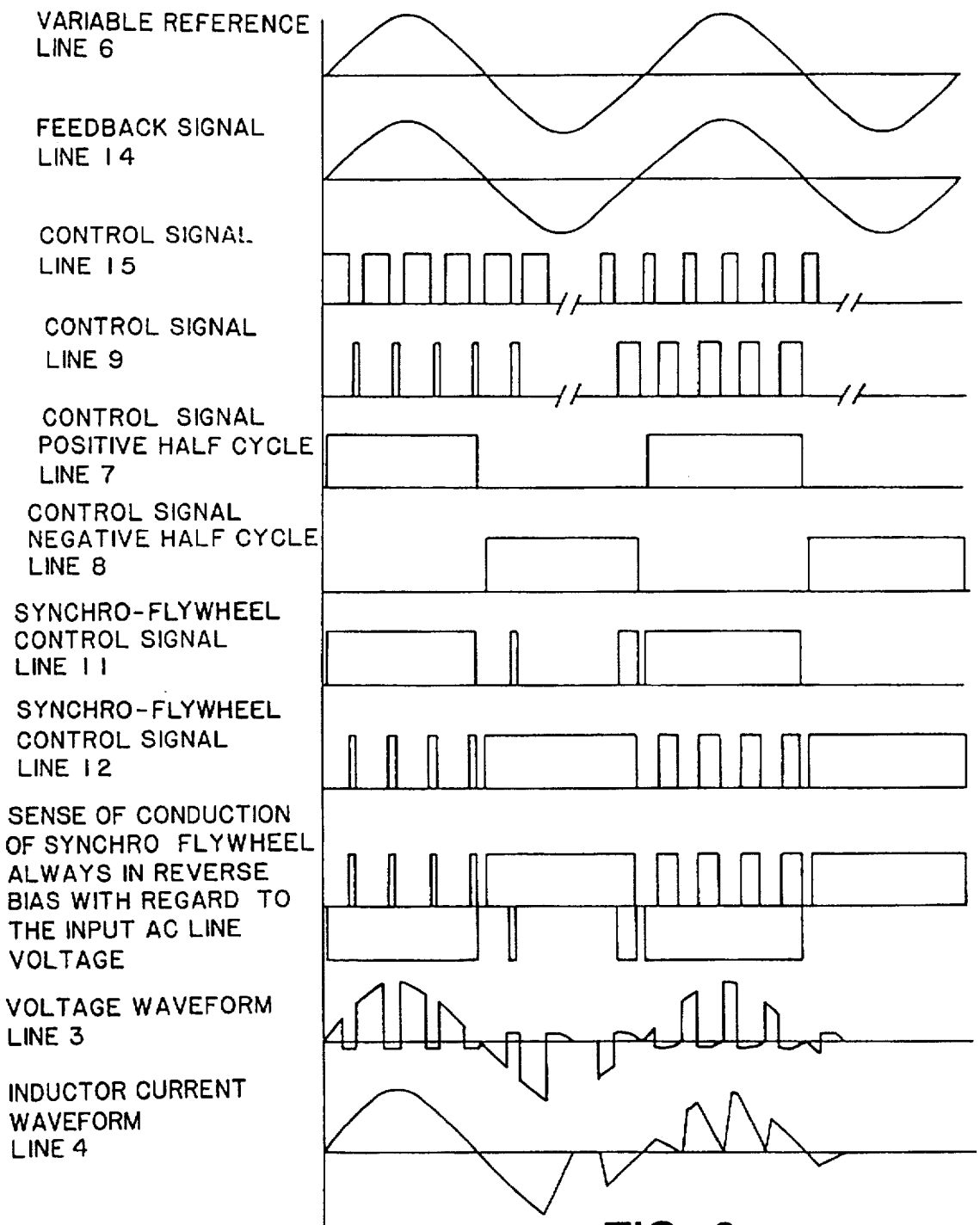
FIG. 3 shows a variety of signals, describing the switch-mode operation of the preferred embodiment.

The synchronized modulator 120 compares the variable reference signal on line 6 and the output voltage signal or feedback signal on line 14, thus controlling proper operation in all quadrants of the applied AC line voltage in synchronized polarity. If both the reference signal 1 and output voltage on line 6 signal on line 14 are positive, both signals are compared by the synchronized modulator 120 with regard to their instantaneous values. As shown in FIG. 3, the duration of the control signal pulses on line 15, as depicted in the left section of the graph, is increased if the output (feedback) voltage signal 14 is lower than the reference signal 6, or decreased, as depicted in the right section of the graph, if the output voltage signal 14 is higher than the reference signal 6. The internal signal on line 15 which controls the on/off duration of the AC solid state switch 20 is a series of control pulses whose duration is proportional to the difference between the reference signal 6 and output voltage feedback signal 14. The control pulses from the synchronized modulator 120 along line 15 will increase in duration, thereby increasing the duration that the AC solid state switch 20 remains on, when the signals meet the following instantaneous values criteria: $0 \leq Vo < Vin$ and $Vref > Vo \geq 0$, where $V_{in}$ is the AC line voltage 1, Vo is the output voltage 5 and Vref is the reference signal 6. The synchronized modulator 120 will reduce the duration of the control pulses on line 15, thereby reducing the duration which the AC solid state switch 20 remains on, when $0 < Vo < Vin$ and $Vref < Vo \leq 0$.

Alternatively, the reference signal 6 and the feedback signal 14 may also be DC signals which are similarly compared.

Figure 6:
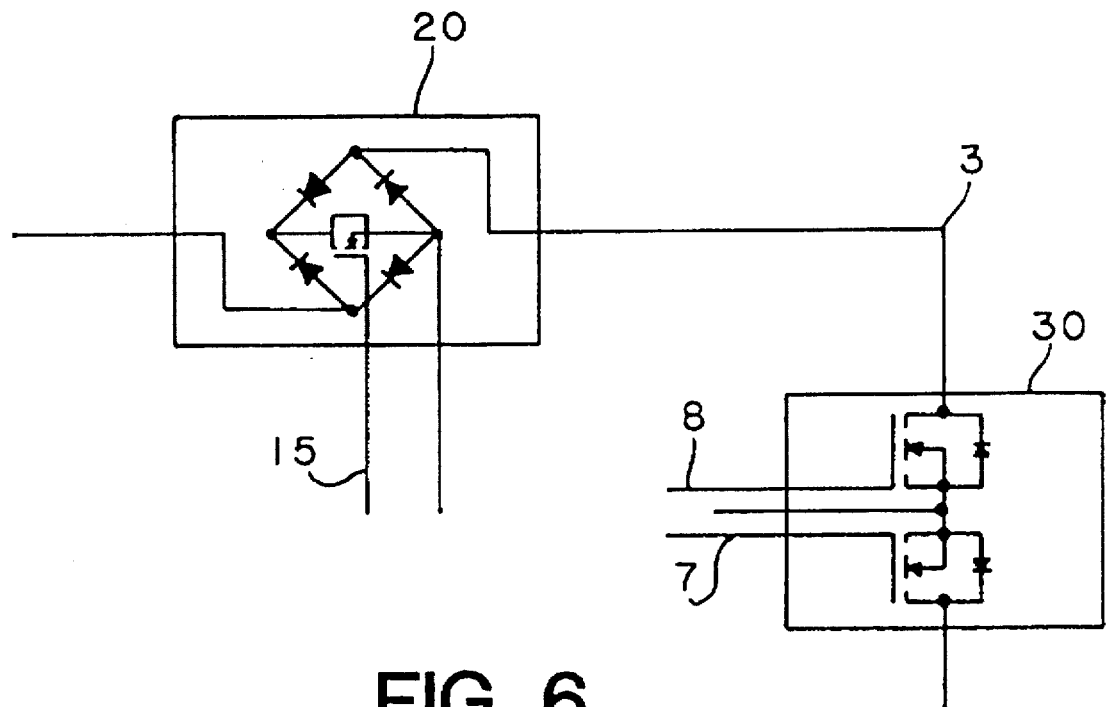
FIG. 6 is a further circuit configuration of the AC solid state switch 20 and synchro-flywheel 30 used in the embodiment as shown in FIGS. 1 and 2.

For a low power load 70 having a relative high internal resistance, it may be necessary to force the discharge of the output filter capacitor 50 in order to maintain a sinusoidal output voltage waveform on line 5, especially in the second and fourth quadrants. The instantaneous polarity of the voltage across the charged capacitor 50 is the same as the instantaneous polarity of the input AC line voltage 1. Since the synchro-flywheel 30 is reversed biased much of the time, the synchronized modulator 120 produces another train of pulses on line 9 when the current sensor 60 connected to the synchronized modulator 120 via line 13 senses that the current flowing to the load 70 on line 5 is below some predetermined value, thus indicating a buildup of charge in the capacitor 50. Each pulse on line 9 occurs after a short time delay of several hundred nanoseconds and ends several hundred nanoseconds before a new pulse is produced on line 15. This prevents the synchro-flywheel 30 from being direct biased during the time the AC solid state switch 20 is on. This delay would be encountered in the preferred embodiments of the solid state switching circuits as shown in FIG. 5 and FIG. 6 by the delays introduced by the gate to source and gate to drain capacitance of any power MOSFETs.

Inductor 40 must be discharged during the time the AC solid state switch 20 is turned off. The synchro-flywheel 30 performs this function by being reversed biased during the time the AC solid state switch 20 is on, and becoming direct biased with regard to the sense of the inductor discharge current when the AC solid state switch 20 is off. A synchro-flywheel controller 80 produces pulses on lines 7 and 8 connected to the "OR" gates 100 and 110, as shown in FIG. 3. Both pulses on lines 7 and 8 are related to the polarity of the input AC line voltage 1, as illustrated in FIG. 3. To avoid any overlaps, each pulse starts a few microseconds after zero crossing of the AC line voltage 1, and ends a few microseconds before zero crossing of the AC line voltage 1. For a high internal resistance load 70, pulses generated on line 9 by the synchronized modulator 120 are summed with pulses generated by the synchro-flywheel controller 80 on lines 7 and 8 by the "OR" gates 100 and 110, resulting in signal pulses on lines 11 and 12. Assuming that the AC line voltage 1 is positive, a pulse on line 7 is generated by the synchro-flywheel controller 80, to turn on the lower MOSFET switch for one half cycle.

The synchro-flywheel 30 is reversed biased with respect to the instantaneous polarity of the AC line voltage 1 during the time the AC solid state switch 20 is on, and therefore no current will flow through it. When the AC solid state switch 20 is off, the collapse of the voltage on line 3 causes the inductor 40 to discharge by producing a reversed polarity voltage on line 3. The "OR" gated pulses from the synchronized modulator 120 on line 9 are then also applied to the synchro-flywheel 30 causing both the MOSFET's to come "ON" and conduct (only during the OFF period of the solid state switch 20). Hence both MOSFETs are "ON" during the OFF period of the solid state switch 20, closing a circuit formed by the inductor 40, the load 70, and the sychro-flywheel 30, allowing the charge/discharge current of the inductor 40 to flow in either direction. The current through the load 70 therefore maintains the same polarity as the current produced by turning on the AC solid state switch 20. The process is performed in reverse when the AC line voltage 1 has a negative instantaneous value, now a pulse is generated instead by the synchro-flywheel controller 80 on line 8.

Figure 4:
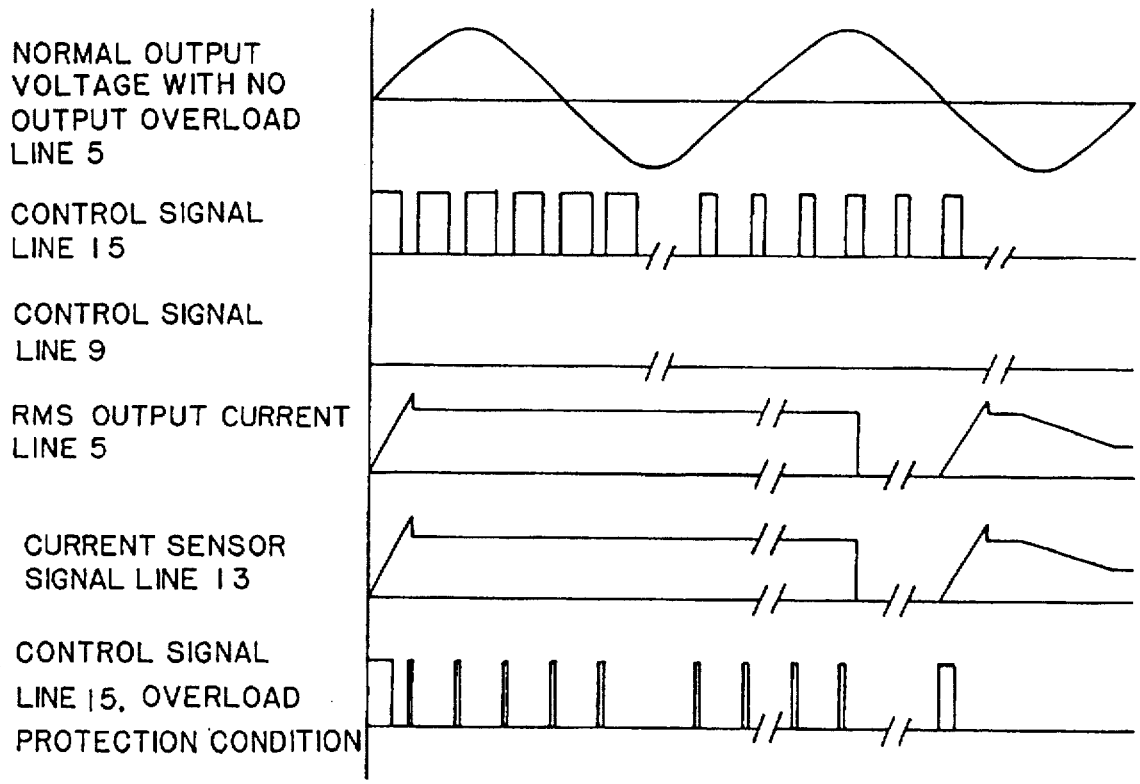
FIG. 4 shows a variety of signals, describing the operation of the output overload and short-circuit protection block, and the temporary current limiting process.

The timing signals of the synchro-flywheel 30 for a high internal resistance load 70 are shown in FIG. 3. The synchro-flywheel 30 is direct biased with regard to the instantaneous polarity of the AC line voltage 1 when the AC solid state switch 20 is off, following the timing rule above described. When the load 70 internal resistance is low, the load current is relatively high, and the capacitor 50 may not need to discharge through the synchro-flywheel 30 during the time the AC solid state switch 20 is off, for proper maintenance of a sinusoidal waveform of the output voltage 5. This case is shown in FIG. 4 as an overload condition. No pulses are generated by the synchronized modulator 120 on line 9, therefore the synchro-flywheel 30 is always reversed biased with respect to the instantaneous polarity of the AC line voltage 1, whether the AC solid state switch 20 is on or off.

Referring again to FIG. 3, in which a number of pulses have been artificially removed from various graphs in order to provide a better understanding of the process, the inductor 40 charge and discharge current waveform is shown. The pulse width modulation switching frequency is set at a value higher than the resonance frequency of inductor 40 and capacitor 50. The output voltage feedback on line 14, and the current sensor 60 supply current information of the load 70 to the synchronized modulator 120, which controls the pulse width modulation at a fixed switching frequency on lines 9 and 15.

Both the AC solid state switch 20 and synchro-flywheel 30 must be protected against output overloads or short-circuits. The current sensor 60 sends its load 70 current signal to the synchronized modulator via line 13. A preset reference signal is compared with the signal on line 13. When an output overload or short-circuit is encountered, the amplitude of the output voltage signal 14 is no longer usable as feedback. As shown in FIG. 4, in the left section of the graph, after a short overshoot, the output current through either a short-circuit or overload is limited to a safe value by drastically reducing the duration of pulses on line 15. If the load current does not fall below its maximum admissible value after a period of time longer than the thermal lag of a typical high power load, a permanent output current shut-off will occur. A system troubleshooting and manual reset will then have to be performed in order to restore normal operation of the regulator. The right section of the graphs shown in FIG. 4 illustrates the normal output current limiting for compensating for the load's thermal lag. When the load reaches its nominal "hot resistance" value, the output current limiting process stops, as further shown by the right section of the graph shown in FIG. 4. All output overload and short-circuit protection and temporary current limiting functions are performed by the synchronized modulator 120. If the current sensor 60 sends a signal on line 13 sufficiently strong to indicate a serious overload or short-circuit, and not just a condition due to the thermal lag of the load, the synchronized modulator 120 will not only take the steps mentioned above, but it will also send a signal on line 16 to the relay 140, opening the relay 140 and terminating all current flow to the load 70. The synchronized modulator will attempt to restart power delivery to the load 70 a predetermined number of times. If the excessive current condition persists, however, the synchronized modulator 120 will cause a final shutdown, after which point the operator must manually reset the regulator before the regulator will operate again. As illustrated in FIG. 10, a remote reset 150 may be used to reset the system after final shutdown.

FIG. 5 and FIG. 6 show two circuits for implementing the AC solid state switch 20 and synchro-flywheel 30. Although power MOSFETS were used in the preferred embodiment, power bipolar transistors and parallel diodes can be also used to perform the same functions.

Figure 7:
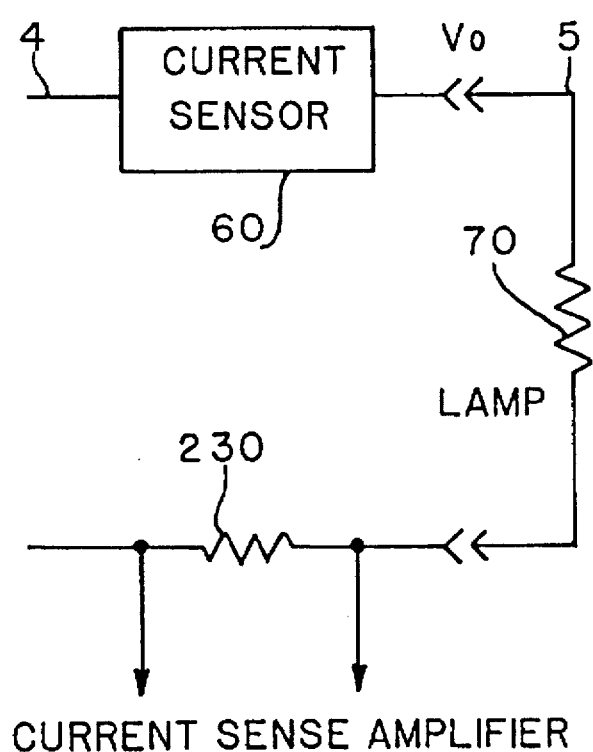
FIG. 7 shows possible locations of the current sensor 60, either as in the preferred embodiment, or as a low value current sense resistor.

FIG. 7 shows two possible configurations and locations for a current sensor 60 or a current sensor 230. Current sensor 60 used in the preferred embodiment is a wide bandwidth current transformer. Alternatively, a sense resistor 230 in series with the load 70 having a low value in the range of under 100 milliohms coupled to an operational amplifier and to the synchronized modulator 120 may be used.

FIG. 8 show the present invention with a power regulator block 1000 powering a load 70, where the load 70 is a florescent light having a ballast and a bulb. The regulator block 1000 receives input from input devices 130, where the input devices 130 can be any combination of an audio, and ambient light, or an infra-red occupancy sensor.

FIG. 9 show the present invention with a power regulator block 1000 powering a load 70, where the load 70 is a light source having a ballast and either a metal halide or a high pressure sodium bulb. The regulator block 1000 receives input from input devices 130, where the input devices 130 can be any combination of an audio, and ambient light, or a infra-red occupancy sensor.

FIG. 10 show the power regulator block 1000 powering a load 70, with a relay 140 in series with the load 70, so as to allow the regulator block 1000 to terminate current flow to the load 70 in case of a short circuit or overload condition. A remote reset 150 allows the regulator block 1000 to be reset in the event that a short circuit of overload caused the regulator 1000 to experience a final shutdown.

It should be understood that this invention may be reduced to practice using a large variety of circuit configurations without departing from the spirit and purpose of this invention.

What is claimed is:

1. A power regulator system connected to an AC power source transmitting an AC current for driving an electrical load, the system comprising:
    a power level selector generating a reference signal indicative of a desired power level for the electrical load;
    a first control circuit having first and second inputs, the first input being connected with the AC power source and receiving the AC current therefrom and the second input being connected with the power level selector and receiving the reference signal therefrom, the first control circuit interrupting flow of the AC current for periods of time responsive to the reference signal to generate a first output AC current; and
    a filtering circuit receiving the first output AC current from the first control circuit and generating therefrom a second output AC current which is smoothed relative to the first AC output current, the filtering circuit comprising an inductor receiving the first AC output current and attenuating therefrom frequency components higher than the frequency of the AC current and a synchro-flywheel acting as an open circuit when the first control circuit is conducting and as a closed circuit when the first control circuit is interrupting flow of the AC current, wherein the second AC output current is applied to the load.

2. The power regulator system of claim 1 wherein the load includes a ballast powering a lighting device.

3. The power regulator system of claim 2 wherein the lighting device comprises an incandescent lamp structure.

4. The power regulator system of claim 2 wherein the lighting device comprises a fluorescent bulb structure.

5. The power regulator system of claim 2 wherein the lighting device comprises a metal halide bulb structure.

6. The power regulator system of claim 2 wherein the lighting device comprises a sodium vapor bulb structure.

7. The power regulator system of claim 1 wherein the power selector includes an operator adjustment mechanism which allows an operator to cause the reference signal to vary.

8. The power regulator system of claim 1 wherein the power selector includes an input device controlling the reference signal.

9. The power regulator system of claim 8 wherein the input device comprises an optical sensor.

10. The power regulator system of claim 8 wherein the input device comprises an infra-red sensor.

11. The power regulator system of claim 8 wherein the input device comprises an audio sensor.

12. The power regulator system of claim 8 wherein the input device comprises a motion sensor.

13. The power regulator system of claim 8 wherein the input device comprises a timer.

14. The power regulator system of claim 1 wherein the first control circuit first input includes a filter filtering noise from current passing therethrough.

15. The power regulator system of claim 1 wherein the first control circuit comprises a solid state switch receiving the AC current from the first input and selectively conducting and interrupting flow of the AC current to generate the first AC output current.

16. The power regulator system of claim 15 wherein the first control circuit further comprises a synchronized motor receiving the reference signal and causing the solid state switch to conduct and interrupt the AC current flow responsive thereto.

17. The power regulator system of claim 11 wherein the filtering circuit further comprises a capacitor further reducing frequency components higher than the frequency of the AC current in the first AC output current.

18. A power regulator system comprising:
    a power level selector having an input device generating an input signal in response to an external stimulus and a variable reference circuit connected with said input device and receiving the input signal therefrom, said variable reference circuit transmitting a reference signal responsive to said input signal;
    a first control circuit having a synchronized modulator circuit receiving said reference signal, and a solid state switch operatively associated with said synchronized modulator and having a first AC current input receiving an AC current and a first AC current output transmitting a first output AC current,
    said first AC current input including a filter filtering noise from said AC current;
    said synchronized modulator causing said AC solid state switch to selectively conduct and interrupt flow of said AC current to said first AC current output such that the power of the first output AC current is responsive to said reference signal;
    a filtering circuit comprising
        an inductor having a second AC current input receiving said first output AC current and a second AC current output transmitting a second AC output current from which frequency components above the frequency of said AC current are attenuated,
        a capacitor operatively associated with said second AC current output wherein said capacitor reduces frequency components in said second AC output current above the frequency of said AC current,
        a synchro-flywheel circuit connected with said second AC current input, said synchro-flywheel acting as an open circuit when said AC solid state switch is conducting and as a closed circuit when said AC solid state switch is interrupting flow of said AC current; and
    an output circuit comprising
        a load receiving said second AC output current;
        a relay contacts connected in series with said load, wherein said relay is operatively associated with a current sensor sensing the second AC output current, said relay opening responsive to said current sensor indicating that said second AC output current has exceeded threshold current level.

19. The power regulator system of claim 18, said load including a ballast powering a light generating device.

20. The power regulator system of claim 19, wherein said light generating device is selected from the group consisting of an incandescent lamp structure, a fluorescent bulb structure, a metal halide bulb structure, and a sodium vapor bulb structure.

21. The power regulator system of claim 18, wherein said input device is selected from the group consisting of optical sensors, infra-red sensors, audio sensors, motion sensors and timers.

* * * * *